(No Model.)

C. S. LOCKWOOD.
BELT FASTENER.

No. 419,590. Patented Jan. 14, 1890.

Attest:
L. Lee.
F. C. Fischer.

Inventor.
Charles S. Lockwood,
per Crane & Miller Attys.

UNITED STATES PATENT OFFICE.

CHARLES S. LOCKWOOD, OF NEWARK, NEW JERSEY.

BELT-FASTENER.

SPECIFICATION forming part of Letters Patent No. 419,590, dated January 14, 1890.

Application filed September 23, 1889. Serial No. 324,725. (No model.)

*To all whom it may concern:*

Be it known that I, CHARLES S. LOCKWOOD, a citizen of the United States, residing at Newark, Essex county, New Jersey, have invented certain new and useful Improvements in Belt-Fasteners, fully described and represented in the following specification and the accompanying drawings, forming a part of the same.

The object of this invention is to provide a belt-fastener easily inserted in the belt, of sufficient strength to perform its function without liability to break or permit the belt to become unfastened, and of such form as to avoid contact with the face of the pulley when the joint of the belt passes over the latter.

The invention consists in a flat strip of metal having outwardly-projecting points or hooks upon one edge at its ends and seats upon its opposite edge intermediate to its ends and in a special construction therefor.

The invention will be more fully understood by reference to the annexed drawings, in which—

Figure 1:
Figure 3:
Figure 2:
Figure 4:
Figure 5:
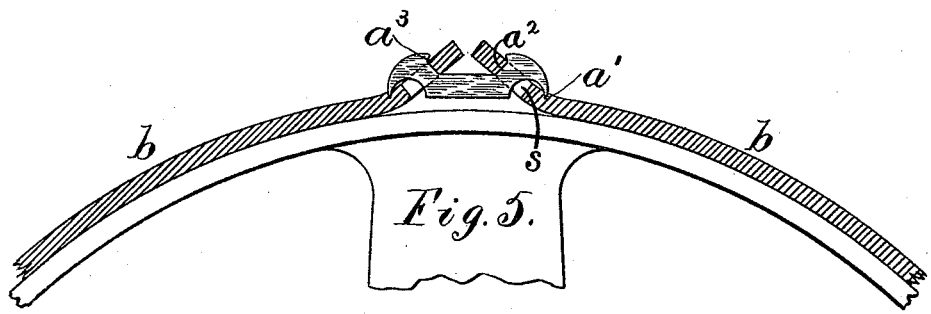
Figure 6:
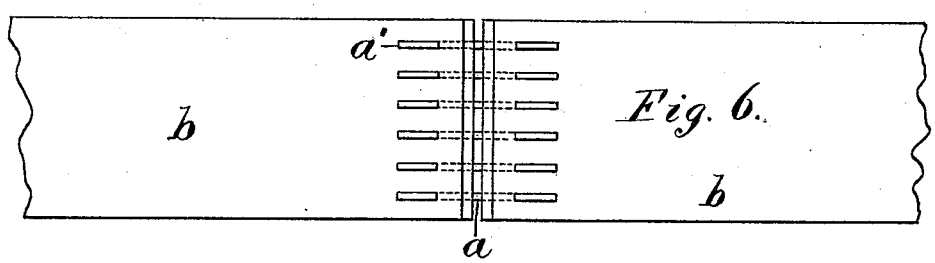
Figure 7:
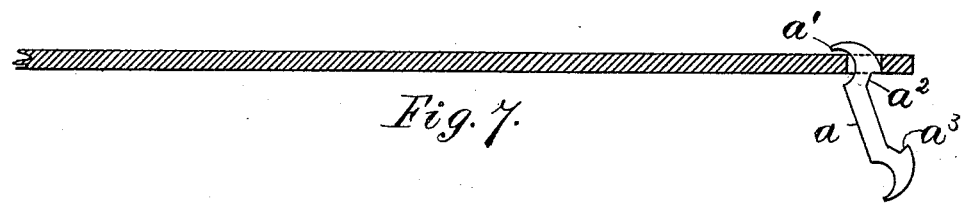
Figure 8:
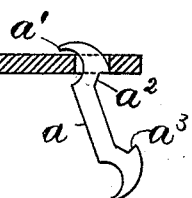

Figure 1 is a side view, and Fig. 2 an edge view, of the preferred construction of my fastener. Figs. 3 and 4 are similar views of a simpler form of the invention. Fig. 5 is a side view of a portion of a pulley with a belt having my improved fasteners applied thereto, the belt being in section through the center of one of the fasteners. Fig. 6 is a plan of the members shown in Fig. 5 with the portion of the pulley omitted. Fig. 7 is an edge view of one end of a belt in section through one of the slots 3 with one of the fasteners partly inserted therein; and Fig. 8 is a plan of one end of a belt, showing slots to receive the fasteners.

The fastener, as shown in Figs. 1 to 4, inclusive, is formed of a strip of sheet metal $a$, having one of its edges notched near the ends to form at its extremities points or hooks $a'$, projecting outward in the same plane with its body portion and with inclined seats $a^2$ on its opposite edge intermediate to the ends. In the construction shown in Figs. 1 and 2 shoulders $a^3$ are formed outside the seats $a^2$ to prevent the displacement of the belt ends which bear upon such seats.

The belt ends $b$ to be united are each provided with a row of narrow slots $s$ of suitable length to receive the ends of the fasteners and of a width equal to the thickness of one of the fasteners, the number of slots in each belt end corresponding with the number of fasteners required to give sufficient strength to the joint.

To insert the fastener one end is inclined nearly at right angles to the surface of the belt and introduced into the slot $s$ from the under side of the belt, as shown in Fig. 7. It is then turned around nearly parallel to the adjacent portion of the belt, thus bringing the outer end of the slot $s$ to bear upon the seat $a^2$, as shown in Fig. 5, the point or hook $a'$ becoming embedded in the upper surface of the belt to take a part of the strain upon the fastener when the belt is in operation and to prevent any tendency of the belt end to slide off the seat $a^2$. The other end of the fastener is inserted in the opposed belt end in a similar manner.

By reference to Fig. 5 it will be noticed that the hooks $a'$ project even with one edge of the fastener, and are therefore considerably in front of the other edge. The straightening of the joint by the application of the belt to a pulley thus causes the bending of the belt ends outward beyond the hooks, throwing the nearer edge of the fastener outward from the inner face of the belt a distance nearly equal to the thickness of the belt, and thereby preventing its contact with the face of the pulley in the passage of the joint over the latter.

As the metal of which the fasteners are formed is quite thin and the fasteners are perfectly flat, and when in position perpendicular to the faces of the belt ends, a sufficient number of them may be applied side by side to make the joint as strong as any other part of the belt, while the position of the fasteners wholly outside the inner face of the belt obviates the twitching produced by the fasteners commonly in use when passing over the pulley.

In practice there is very little tendency for the belt end to slip off the seat $a^2$, and it is not therefore absolutely necessary to apply the shoulder $a^3$ to the simpler form of fastener shown in Figs. 3 and 4.

Although shown inclined herein, the seats $a^2$ may be made parallel with the opposite edge of the fastener, provided shoulders $a^3$ are employed, or they may be formed at any angle thereto that may be found desirable.

Having thus set forth the nature of my invention, what I claim herein, and desire to secure by Letters Patent, is—

1. A belt-fastener consisting in a flat strip of metal adapted to receive the strain of the belt edgewise, one of its edges being formed with points or hooks at the ends and the other with seats intermediate to its ends, substantially as shown and described.

2. A belt-fastener consisting in a flat strip of metal adapted to receive the strain of the belt edgewise, one of its edges being formed with points or hooks at the ends and the other with inclined seats intermediate to its ends, and with shoulders at the outer ends of the seats, substantially as shown and described.

In testimony whereof I have hereunto set my hand in the presence of two subscribing witnesses.

CHARLES S. LOCKWOOD.

Witnesses:
   THOS. S. CRANE,
   L. LEE.